US006625542B1

(12) United States Patent
Hardage et al.

(10) Patent No.: US 6,625,542 B1
(45) Date of Patent: Sep. 23, 2003

(54) DETERMINING ANISOTROPY IN A STRATUM USING SCATTERED VERTICAL AND HORIZONTAL SHEAR MODES

(75) Inventors: Bob Hardage, Austin, TX (US); Robert J. Graebner, Dallas, TX (US)

(73) Assignee: Board of Regents for the University of Texas System, Austin, TX (US)

( * ) Notice: Subject to any disclaimer, the term of this patent is extended or adjusted under 35 U.S.C. 154(b) by 0 days.

(21) Appl. No.: 09/954,351

(22) Filed: Sep. 17, 2001

Related U.S. Application Data

(63) Continuation-in-part of application No. 09/436,453, filed on Nov. 8, 1999, now abandoned.

(51) Int. Cl.[7] .................................................. G01V 1/00
(52) U.S. Cl. .......................................... 702/14; 367/75
(58) Field of Search ..................... 702/14, 16; 181/112; 367/13, 56, 59, 75, 36; 703/5, 10; 175/45

(56) References Cited

U.S. PATENT DOCUMENTS 4,803,666 A * 2/1989 Alford .......................... 367/36
5,060,204 A * 10/1991 Winterstein ................... 367/75
5,136,554 A * 8/1992 Thomsen et al. .............. 367/75
5,610,875 A * 3/1997 Gaiser ........................... 367/75
6,205,403 B1 * 3/2001 Gaiser et al. .................. 702/14
6,292,754 B1 * 9/2001 Thomsen ....................... 702/14

* cited by examiner

Primary Examiner—John Barlow
Assistant Examiner—Victor J. Taylor
(74) Attorney, Agent, or Firm—Hitt Gaines, PC

(57) ABSTRACT

The present invention provides a system for, and method of determining anisotropy in a stratum using scattered horizontal shear and vertical shear modes. The method includes transforming seismic energy wave generated by a seismic energy source and received by seismic receivers into radial/transverse coordinate space, determining a seismic energy wave corridor along a radial path between the seismic energy source and the seismic receivers, and gathering seismic data received by the seismic receivers within the corridor wherein the data includes horizontal and vertical shear components.

25 Claims, 11 Drawing Sheets

DETERMINING ANISOTROPY IN A STRATUM USING SCATTERED VERTICAL AND HORIZONTAL SHEAR MODES

CROSS-REFERENCE TO RELATED APPLICATION

The present application is a continuation-in-part of U.S. patent application Ser. No. 09/436,453, filed on Nov. 8, 1999, entitled "Method of Seismic Exploration by Discriminating Horizontal and Vertical Shear Waves," commonly assigned with the present application and incorporated herein by reference.

TECHNICAL FIELD OF THE INVENTION

The present invention is directed, in general, to geophysical exploration and, more specifically, to a system and method for determining anisotropy in a stratum using scattered vertical and horizontal shear modes.

BACKGROUND OF THE INVENTION

Most geophysical techniques currently dealing with multi-dimensional seismic data do not discriminate between seismic energies of different orientations, such as the compressional energy or vertical and horizontal shear energies of reflected seismic data systems. In a typical multi-dimensional seismic survey, a multi-mode seismic energy generator may be used to generate a preponderance of one orientation of seismic energy relative to a particular orientation. Then a preponderance of energies orthogonal to the first but relative to the same orientation may also be generated. However, the orientation of the received seismic energy changes at each receiver station due to a difference in orientation between the seismic energy source and each receiver in a multi-dimensional seismic array.

Differently oriented seismic energies may also propagate differently through the subsurface strata based upon the characteristics of the subsurface strata. Anisotropies in the subsurface strata also impact the seismic energies of different orientations, especially shear wave energy. Anisotropic subsurface parameters may be found in the form of thin-bed strata, laminae and bed matrix grains or pores that have a preferential direction caused by deposition or tectonic stress. Another common form of anisotropic subsurface properties are subsurface fractures. Anisotropies cause subsurface parameters such as permeability, shear strength and seismic velocities to have different values in different directions.

Compressional energy waves may generate vertical shear energy waves at subsurface interfaces. Additionally, vertical and horizontal shear waves may acquire significant second-order properties in areas containing subsurface anisotropies that complicate the problem of intermingling but also offer opportunity for analysis if the energies could be segregated. However, the processing of such data is complicated due to the intermingling and therefore not easily discriminated into the differently oriented energies for each source-receiver azimuth. Also, the processing of these components is further complicated since the orientation of the operational modes of the seismic energy source do not generally correspond to the orientation of each receiver in the geophysical data acquisition array.

The mapping of subsurface features may be greatly enhanced by processing the differently oriented seismic energies in a way that accommodates their different attributes. This is especially true in an orientation specific to the azimuths defined by each seismic energy source and receiver pair. Additionally, important rock property information could be ascertained by comparing differences and similarities of the attributes of the appropriately oriented seismic energies.

Accordingly, what is needed in the art is a way to more effectively segregate and differentiate subsurface anisotropic situations in seismic surveying situations.

SUMMARY OF THE INVENTION

To address the above-discussed deficiencies of the prior art, the present invention provides a system for, and method of determining anisotropy in a stratum using scattered horizontal shear and vertical shear modes. In one embodiment, the method includes transforming seismic energy wave generated by a seismic energy source and received by seismic receivers into radial/transverse coordinate space, determining a seismic energy wave corridor along a radial path between the seismic energy source and the seismic receivers and gathering seismic data received by the seismic receivers within the corridor wherein the data includes horizontal and vertical shear components.

In another embodiment, transforming includes orienting a first seismic receiver with a seismic energy source along a radial path between the first seismic receiver and the seismic energy source to obtain a vertical shear component, and aligning a second seismic receiver substantially transverse to the radial path to obtain a horizontal shear component. In this particular embodiment, the first and second seismic energy receivers may be substantially orthogonal with respect to each other and transforming further includes orienting first and second seismic energy receivers such that the first seismic energy receiver is aligned substantially perpendicular to a reflected seismic energy wave having an angle of emergence to thereby maximize the vertical shear energy received by the first seismic energy receiver. The second seismic energy receiver is aligned substantially tangential to this reflected seismic energy wave. In another aspect of this particular embodiment, the seismic energy receiver further includes a third seismic energy receiver substantially orthogonal to the first and second seismic energy receivers and orienting first and second seismic energy receivers includes aligning the third seismic energy with the reflected seismic energy wave.

In yet another embodiment transforming seismic energy includes transforming waves generated by a seismic energy source and received by a plurality of seismic receivers within the corridor into radial/transverse coordinate space. In such embodiments, gathering may include summing data received by the plurality of seismic receivers and dividing the plurality of seismic receivers into stacking bins. In another embodiment, determining includes determining an azimuth of the corridor with respect to the seismic energy source and a width of the corridor.

The present invention also provides, in another embodiment a system for determining anisotropy in a stratum using scattered horizontal shear and vertical shear modes. In an advantageous embodiment, the system includes a seismic energy source, reflected seismic energy wave reflected from a subsurface interface and having horizontal shear energy and vertical shear energy associated therewith, first and second seismic energy receivers, wherein the first seismic energy receiver is aligned radially with the seismic energy source and wherein the second seismic energy receiver is aligned substantially transverse with the seismic energy source. The system further includes a seismic energy wave corridor extending along a radial path between the seismic energy source and the first seismic energy receiver, seismic data received by the first and second seismic receivers within the corridor wherein the data includes vertical and horizontal shear components, and separated vertical and horizontal shear component data.

In another aspect, the present invention provides a method of exploring a subterranean feature with seismic energy. In one exemplary embodiment, the method includes generating a seismic energy wave toward a subterranean feature, reflecting the seismic energy from the subterranean feature to produce a reflected seismic energy wave having vertical and horizontal shear energy associated therewith, transforming seismic energy wave generated by a seismic energy source and received by seismic receivers into radial/transverse coordinate space, determining a seismic energy wave corridor along a radial path between the seismic energy source and the seismic receivers, and gathering seismic data received by the seismic receivers within the corridor wherein the data includes horizontal and vertical shear components.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

Referring initially to FIGS. 1A and 1B, illustrated are a plan view of a volumetric or three dimensional (3-D) seismic survey system 100 and a partial cutaway view of a recording vehicle 105, respectively. The seismic survey system 100 includes essentially orthogonal first and second seismic energy sources Sil, Scl located at a source station A and essentially orthogonal first and second seismic energy receivers Ril, Rcl located at a receiver station B. The seismic survey system 100 also includes the recording vehicle 105 employing a computer 110, which captures and records seismic data received by the first and second seismic energy receivers Ril, Rcl. The computer 110 may also employ algorithms to manipulate the seismic data. As shown in FIG. 1A, both source and receiver stations A, B are positioned with respect to essentially orthogonal inline and crossline locations collectively designated INLINE 1–10 and CROSSLINE 1–10. This orientation is commonly called field coordinate space.

In the illustrated embodiment, the source station A is located on a CROSSLINE 2 and positioned midway between an INLINE 4 and an INLINE 5. The receiver station B is located at the intersection of an INLINE 9 and a CROSSLINE 10. These are arbitrary locations and of course, receivers at more than one receiver station may be arrayed about the source station A (typically at inline-crossline intersections) to receive and record additional reflected seismic energy in a volumetric seismic survey. The first seismic energy source Sil is an inline-polarized horizontal source, and the second seismic energy source Scl is a crossline-polarized horizontal source. Similarly, the first seismic energy receiver Ril is an inline horizontal sensor, and the second seismic energy receiver Rcl is a crossline horizontal sensor. Although not specifically detailed in FIG. 1A, source station A and receiver station B also include a vertical seismic energy source Sv and a vertical seismic energy receiver Rv, respectively.

In the seismic survey system 100, the seismic energy imparted at the source station A into the subsurface formations of the earth contains seismic energy modes of various orientations. Generally, these oriented seismic energies contain vertical shear waves, horizontal shear waves, and compression waves. In the field coordinate orientation of FIG. 1A, the first and second seismic energy receivers Ril, Rcl receive energies from each of these three modes or orientations that are intermingled together in a way that complicates data processing and imaging.

Figure 1A:
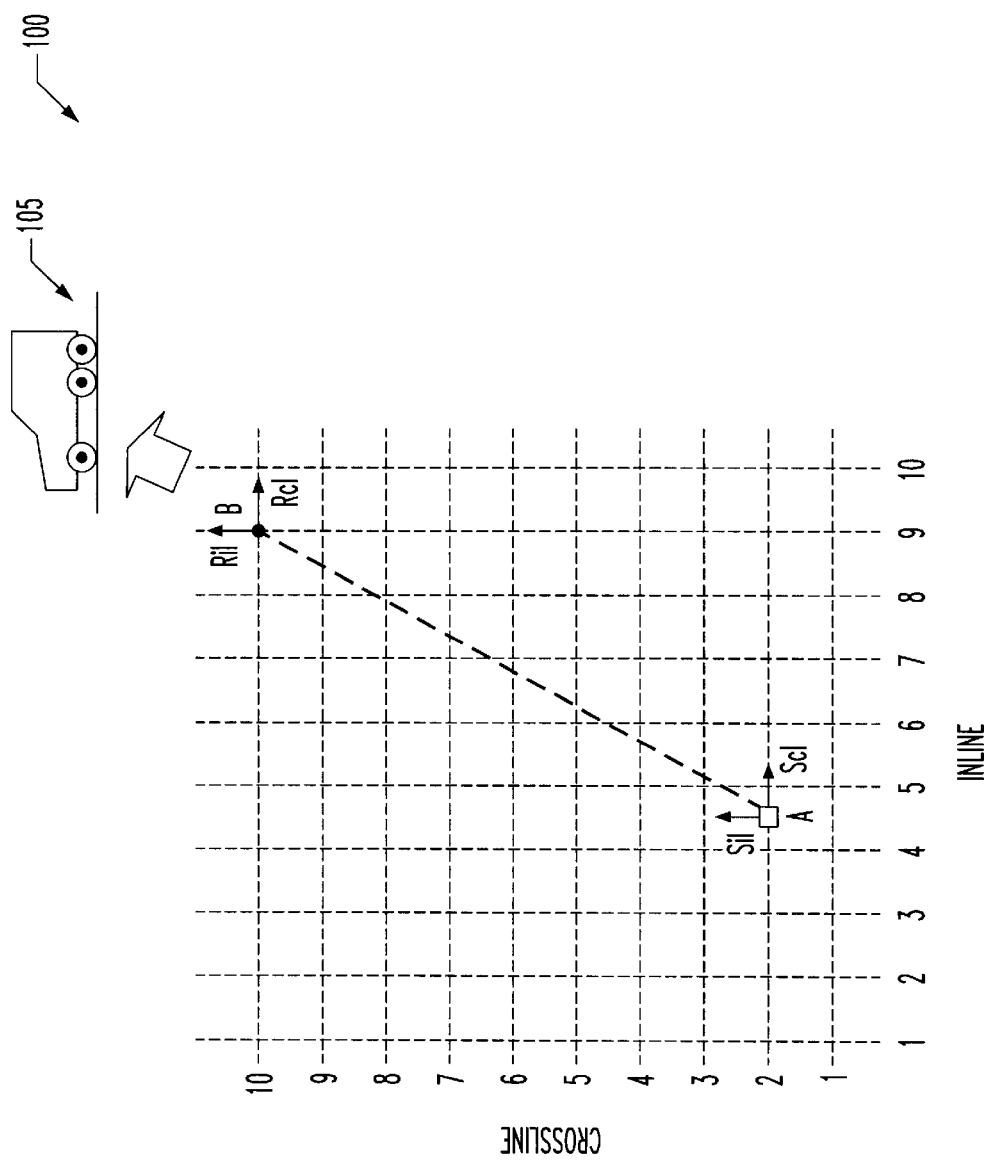
FIGS. 1A and 1B illustrate a plan view of a volumetric or three dimensional (3-D) seismic survey system and a partial cutaway view of a recording vehicle, respectively
Figure 1B:
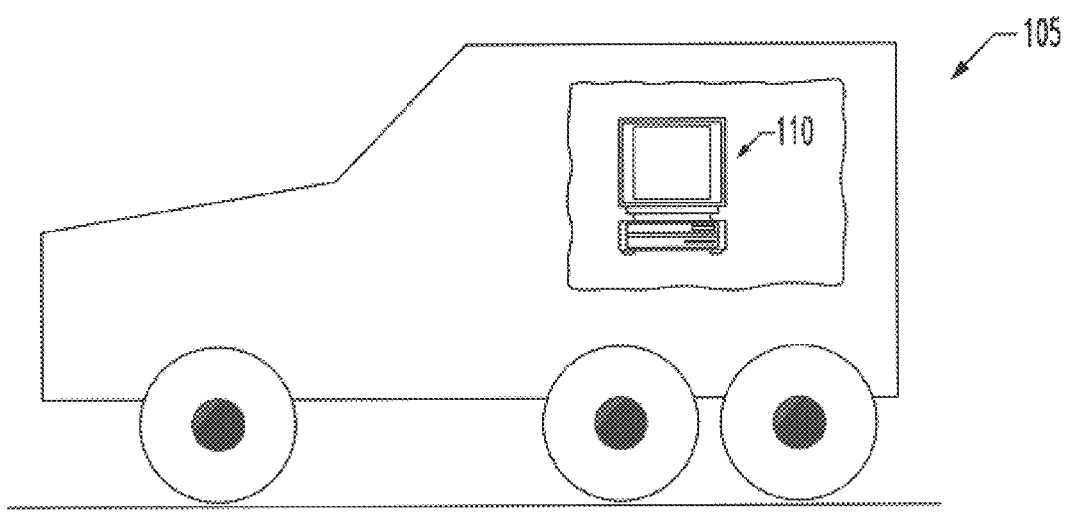
Figure 2:
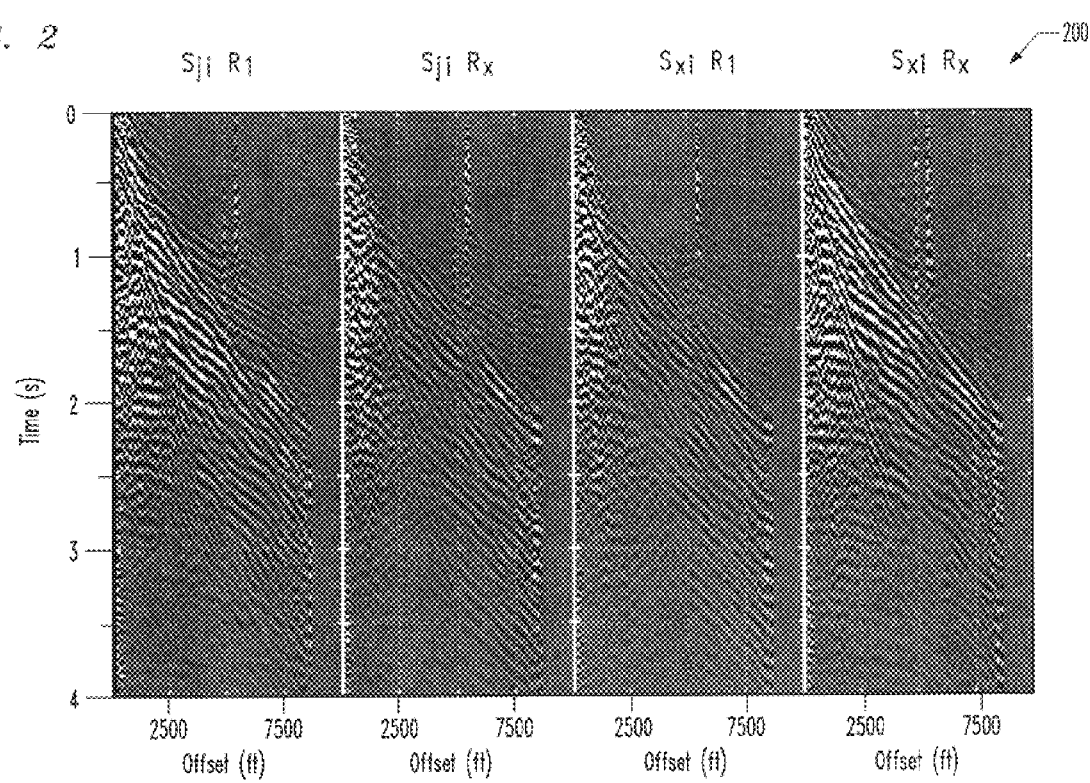
FIG. 2 illustrates a time/offset survey data plot using multiple nine-component, three-dimensional (9C3D) source-receiver stations having an inline and crossline orientation (field coordinate space), as shown in FIG. 1A.

Turning now to FIG. 2, illustrated is a time/offset survey data plot 200 using multiple nine-component, three-dimensional (9C3D) source-receiver stations having an inline and crossline orientation (field coordinate space), as shown in FIG. 1A. The time/offset survey data plot 200 utilizes four source-receiver data sets including a first data set Si;Ri, a second data set Si;Rx, a third data set Sx;Ri and a fourth data set Sx;Rx. The first data set Si;Ri uses data generated by inline seismic energy sources and received by inline seismic energy receivers. The second data set Si;Rx uses data generated by inline seismic energy sources and received by crossline seismic energy receivers. The third data set Sx;Ri uses data generated by crossline seismic energy sources and received by inline seismic energy receivers. The fourth data set Sx;Rx uses data generated by crossline seismic energy sources and received by crossline seismic energy receivers.

DETAILED DESCRIPTION

The time/offset survey data plot 200 consists of super gathers of prestack data, which are first sorted into 100 foot offset bins where each offset bin is then stacked to produce a mean stack. Compressional wave energy is apparent in both the first and fourth data sets Si;Ri, Sx;Rx preceding the first arrival of the shear wave, although the compressional wave energy is somewhat stronger on the first data set Si;Ri. Because the recording template is neither exactly square or uniformly sampled with source stations, the first data set Si;Ri contains slightly more vertical shear energy, and the fourth data set Sx;Rx contains slightly more horizontal shear energy. A difference may be observed in the behavior of the surface waves between the first and fourth data sets Si;Ri, Sx;Rx.

It may also be observed that the crossterm second and third data sets Si;Rx, Sx;Ri are very similar. The energy in the crossterm second and third data sets Si;Rx, Sx;Ri is not related to azimuthal anisotropy, as is often interpreted, but is related to the acquisition geometry of the data. This is the principal reason why efforts to use wavefield splitting concepts to minimize crossterm energy for 9C3D data and to determine an anisotropy or its orientation axes in field coordinate space is fundamentally flawed.

Figure 3:
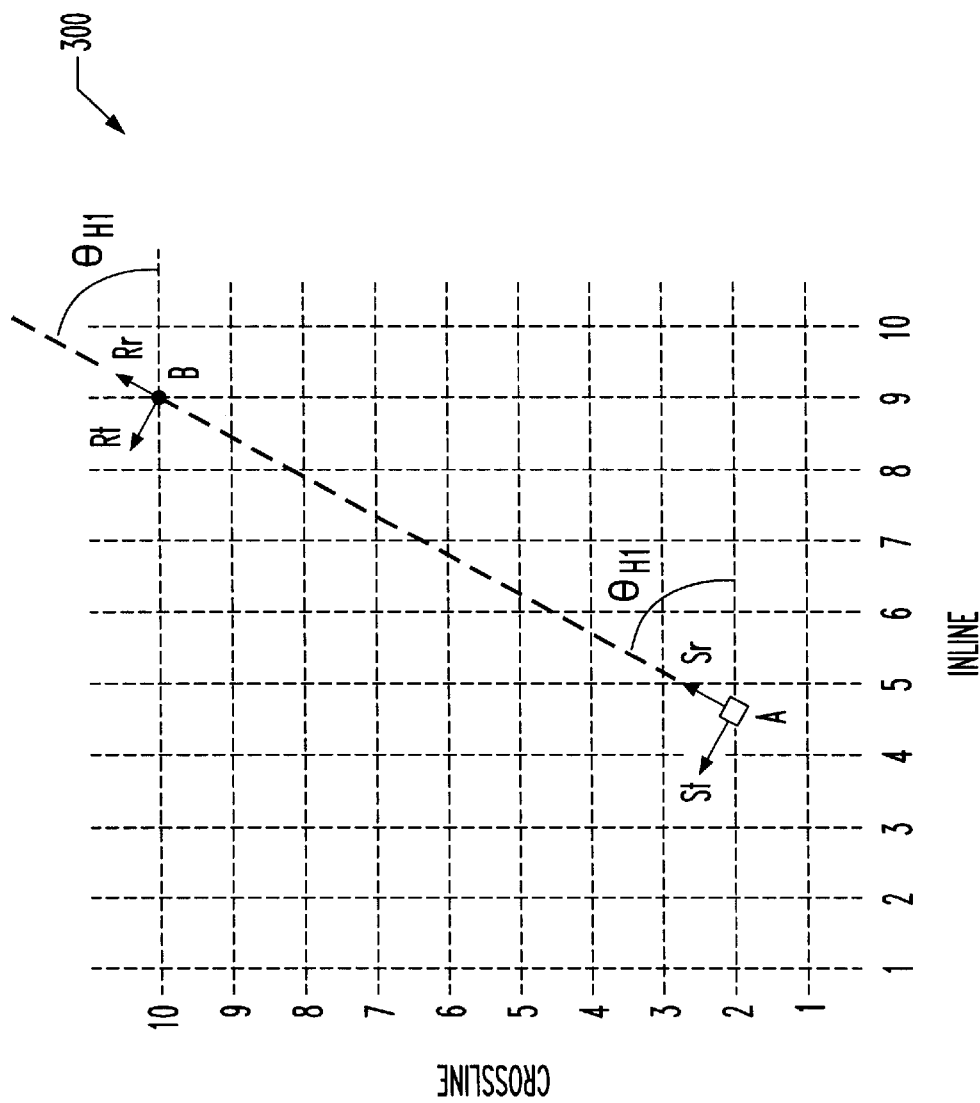
FIG. 3 illustrates a plan view of an embodiment of a seismic survey system showing a transformation in the horizontal plane of the seismic survey system of FIG. 1A.

Turning now to FIG. 3, illustrated is a plan view of a seismic survey system 300 showing a transformation in the horizontal plane of the seismic survey system 100 of FIG. 1A. The seismic survey system 300 includes essentially orthogonal first and second seismic energy sources Sr, St located at a source station A and essentially orthogonal first and second seismic energy receivers Rr, Rt located at a receiver station B. As shown in FIG. 3, both source and receiver stations A, B are still positioned with respect to essentially orthogonal inline and crossline locations collectively designated INLINE 1–10 and CROSSLINE 1–10, as before. However, the seismic survey system 300 employs a unique coordinate rotation to transform the horizontal sources and receivers from the inline and crossline orientation (field coordinate space) of FIG. 1A to a radial and transverse orientation (radial/transverse coordinate space), as shown in FIG. 3.

This coordinate change employs a trigonometric rotation of both the sources and receivers as defined by an azimuth angle $\Theta_{H1}$. The azimuth angle $\Theta_{H1}$ is defined as the angle between the crossline direction and a straight line formed through the source-receiver station pair A-B, as shown in FIG. 3. This coordinate change is typically accomplished through manipulation and processing of the recorded seismic data, preferably with computers and the appropriate software to accomplish the data manipulation. One who is skilled in the art would understand how to program the computer to make the appropriate data manipulations using the trigonometric function mentioned above. However, this coordinate change may also be accomplished by physically orienting the sources and receivers as shown in FIG. 3.

This rotation is critical for separating wave modes in a 3-D multi-component seismic data acquisition geometry. This coordinate rotation transforms the seismic data to allow the first receiver Rr and the first seismic energy source Sr, which are oriented in the radial direction, to effectively provide a wavefield that is dominated by compression and vertical shear modes. This arrangement minimizes interference from horizontal shear modes. Correspondingly, the rotation also transforms the seismic data to allow the second seismic energy receiver Rt and the second seismic energy source St, which are oriented in the transverse direction, to effectively provide a wavefield that is dominated by horizontal shear reflections having minimal interfering compression and vertical shear modes. This allows further data processing steps to proceed in a more robust manner.

Figure 4:
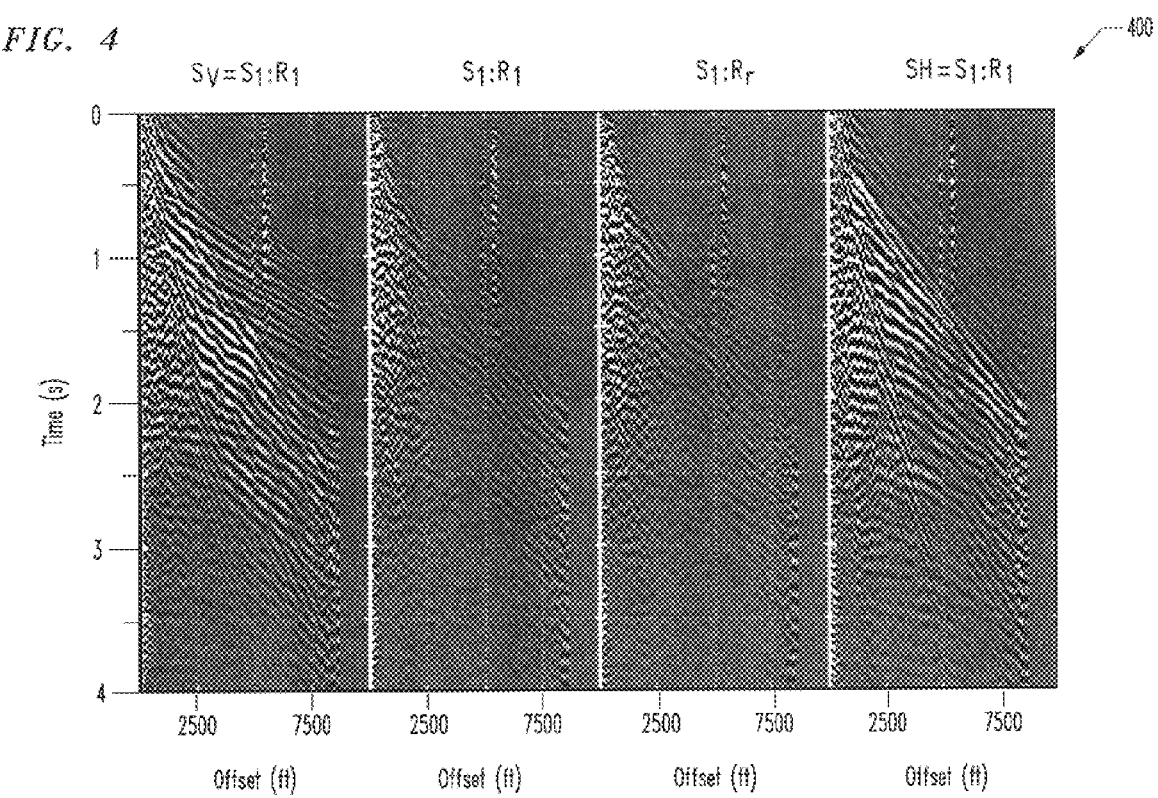
FIG. 4 illustrates a time/offset survey data plot using multiple nine-component, three-dimensional (9C3D) source-receiver stations having a radial and transverse orientation (radial/transverse coordinate space), as shown in FIG. 3.

Turning now to FIG. 4, illustrated is a time/offset survey data plot 400 using multiple nine-component, three-dimensional (9C3D) source-receiver stations having a radial and transverse orientation (radial/transverse coordinate space), as shown in FIG. 3. The time/offset survey data plot 400 utilizes four source-receiver data sets including a first data set Sr;Rr, a second data set Sr;Rt, a third data set St;Rr and a fourth data set St;Rt. The first data set Sr;Rr uses data generated by radial seismic energy sources and received by radial seismic energy receivers. The second data set Sr;Rt uses data generated by radial seismic energy sources and received by transverse seismic energy receivers. The third data set St;Rr uses data generated by transverse seismic energy sources and received by radial seismic energy receivers. The fourth data set St;Rt uses data generated by transverse seismic energy sources and received by transverse seismic energy receivers.

The time/offset survey data plot 400 consists of super gathers of prestack data similar to the time/offset survey data plot 200 shown in FIG. 2. However, the super gathers of FIG. 4 are done in the radial and transverse orientation thereby enhancing vertical shear energy in the first data set Sr;Rr and horizontal shear energy in the fourth data set St;Rt. Compressional wave energy has been rotated into the radial coordinate data. Surface waves may be seen to be more coherent than in field coordinates. Rayleigh waves on the vertical shear energy and Love waves on the horizontal shear energy may also be seen in FIG. 4. Shear wave reflections are more visible in the horizontal shear data at offsets outside the surface wave noise cone.

The signal-to-noise ratio on first arrivals of the shear waves is higher on the horizontal shear data. The head wave of the horizontal shear energy may be seen easily at offset-time coordinates of 2,500 feet and 0.7 seconds, 5,000 feet and 1.4 seconds and 7,500 feet and 1.9 seconds. The apparent head wave of the vertical shear energy may be seen at offset-time coordinates of 2,500 feet and 0.8 seconds, 5,000 feet and 1.6 seconds and 7,500 feet and 2.4 seconds. A difference in the first-arrival times of the head waves for vertical and horizontal shear energies also may be noted. This difference is an indication that vertical transverse isotropy (layering) is important in the surveyed area. The vertical shear wave velocity is 25 percent slower than the horizontal shear wave velocity. This is a normal, first-order condition that occurs even in subsurface mediums or environments that are transversely isotropic. The ability to observe this attribute of shear wave energy is a critical first step to accurately detecting areas of anisotrophy, such as thin bedded strata, laminae and even elongated matrix grains (or pores) that are oriented in a preferential direction by deposition or tectonic stress.

Figure 5:
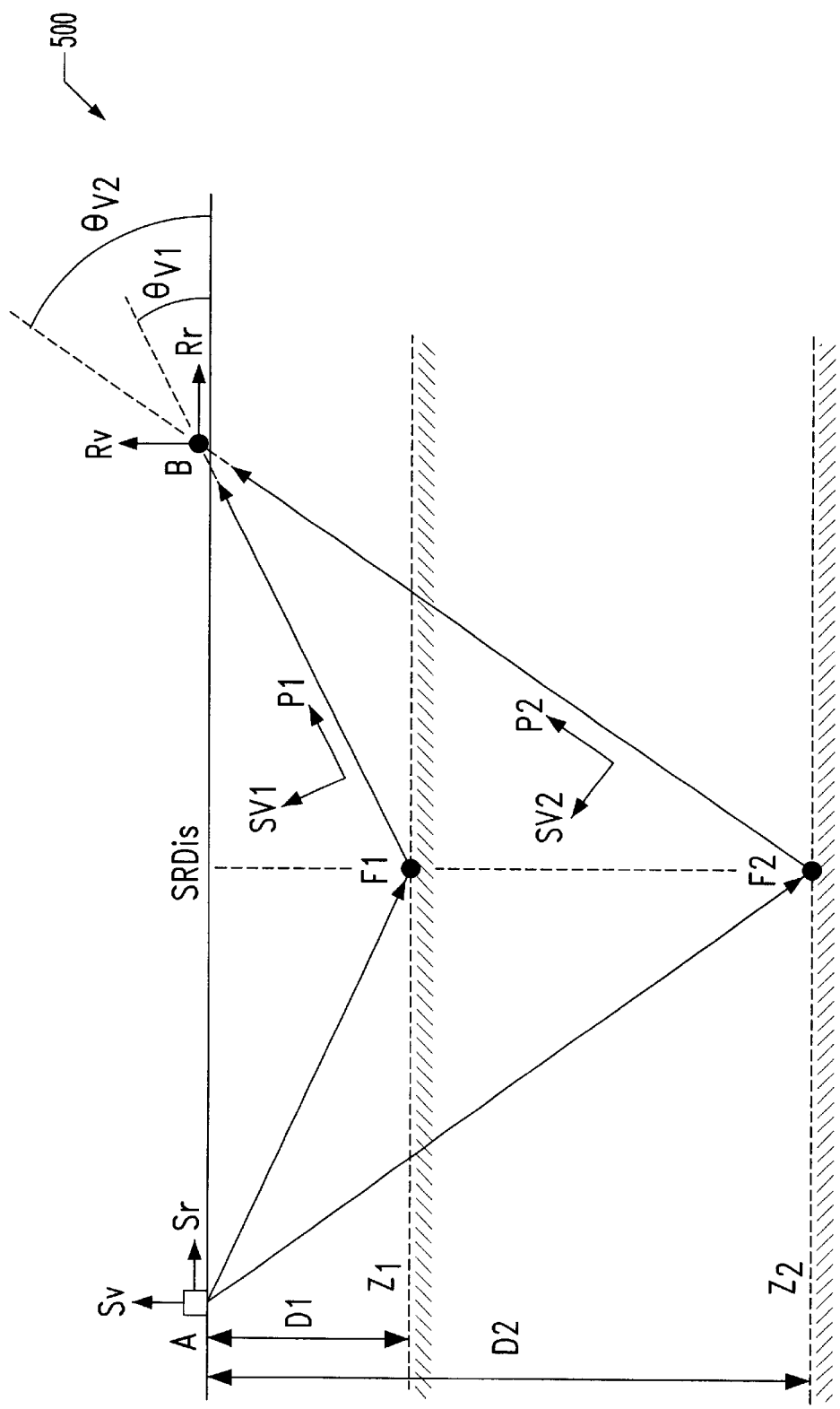
FIG. 5 illustrates a vertically sectioned plane view of an embodiment of a seismic survey system taken along the straight line formed through the source-receiver station pair of FIG. 3.

Turning now to FIG. 5, illustrated is a vertically sectioned plane view of a seismic survey system 500 taken along the straight line formed through the source-receiver station pair A-B of FIG. 3. The seismic survey system 500 includes a surface receiver station B having a radial seismic energy receiver Rr oriented along the path of the source-receiver station pair A-B and a substantially orthogonal vertical seismic energy receiver Rv. Although not specifically detailed in FIG. 5, the receiver station B also includes a transverse seismic energy receiver Rt, as was shown in FIG. 3. The seismic survey system 500 also includes a first subsurface interface $Z_1$ located at a first depth D1 having a first subterranean feature F1 and a second subsurface interface $Z_2$ located at a second depth D2 having a second subterranean feature F2. The embodiment of FIG. 5 displays a radial and vertical coordinate orientation (radial/vertical space).

The seismic survey system 500 further includes a source station A, located on the surface, having a radial seismic energy source Sr, a vertical seismic energy source Sv and a transverse seismic energy source St (not shown), as before. The source station A is located at a source-receiver distance SRDis from the receiver station B. The seismic energy sources located at the source station A generate seismic energy along a first wavepath A-F1-B that provides a first reflected seismic energy wave F1-B and along a second wavepath A-F2-B that provides a second reflected seismic energy wave F2-B, as shown. In the illustrated embodiment, the first and second reflected seismic energy waves F1-B, F2-B have first and second angles of emergence $\Theta_{V1}$, $\Theta_{V2}$, as seen in FIG. 5.

Generally, an angle of emergence may be defined as the angle between a path of a reflected seismic energy wave and a line containing the axis of a radial seismic energy receiver. Both the path of the reflected seismic energy wave F1-B and the axis of the radial seismic energy receiver Rr should also lie within a vertically sectioned plane, such as that shown in FIG. 5. Additionally, if the axis of the radial seismic energy receiver Rr is above or below a horizontal line, the first and second angles of emergence $\Theta_{V1}$, $\Theta_{V2}$ will be respectively less than or greater than those shown in FIG. 5.

The first and second reflected seismic energy waves F1-B, F2-B contained in the seismic survey system 500 include essentially orthogonal compression and vertical shear waves. Horizontal shear waves have been made normal to the vertically sectioned view of FIG. 5 by the horizontal rotation achieved in the embodiment of FIG. 3. The first reflected seismic energy wave F1-B includes a first compression wave P1 and a first vertical shear wave SV1. The second reflected seismic energy wave F2-B includes a second compression wave P2 and a second vertical shear wave SV2, as shown. This reflected seismic energy is received by the radial seismic energy receiver Rr and the vertical seismic energy receiver Rv at different first and second angles of emergence $\Theta_{V1}$, $\Theta_{V2}$. This situation provides another intermingled data condition that again typically complicates processing, imaging and interpreting seismic information.

Figure 6:
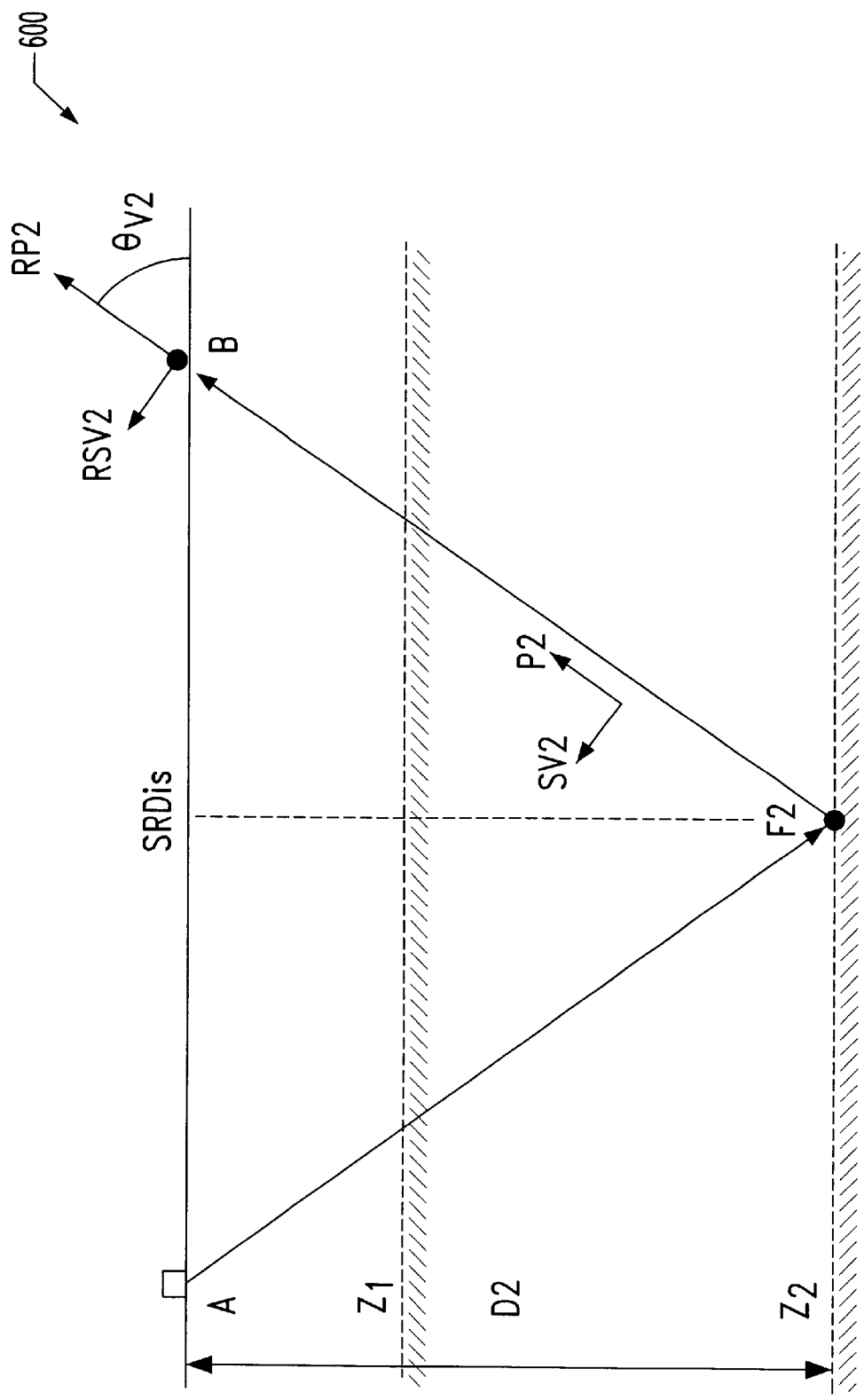
FIG. 6 illustrates a vertically sectioned plane view of an embodiment of a seismic survey system showing a transformation of the seismic survey system of FIG. 5.

Turning now to FIG. 6, illustrated is a vertically sectioned plane view of a seismic survey system 600 showing a transformation of the seismic survey system 500 of FIG. 5. The vertically sectioned plane view of FIG. 6 is taken along the straight line formed through the source-receiver station pair A-B as was shown in FIG. 3. The various subsurface geometries of FIG. 6 remain the same as in FIG. 5. Alternatively, the transformation shown in the seismic survey system 600 converts the radial and vertical coordinate orientation (radial/vertical space) of FIG. 5 to a compression and vertical shear coordinate orientation (compression/vertical shear space). Correspondingly, this second coordinate change is accomplished by another simple rotation of the receivers shown in FIG. 5.

The seismic survey system 600 includes a first receiver that is a compression seismic energy receiver RP2 and a substantially orthogonal second receiver that is a vertical shear seismic energy receiver RSV2. Both the compression seismic energy receiver RP2 and the vertical shear seismic energy receiver RSV2 have been rotated from the orientation shown in the seismic survey system 500 of FIG. 5 by an amount equal to the second angle of emergence $\Theta_{V2}$, as shown in FIG. 6. Recall that the second angle of emergence $\Theta_{V2}$ is defined as the angle between the second reflected seismic energy wave F2-B and the axis of the radial seismic energy receiver Rr of FIG. 5. In FIG. 6, the second angle of emergence $\Theta_{V2}$ is the angle between the axis of the compression seismic energy receiver RP2 and a horizontal line.

This rotation orients the compression seismic energy receiver RP2 such that it is aligned with the second angle of emergence $\Theta_{V2}$. This coordinate rotation thereby allows the compression seismic energy receiver RP2 to maximize the compressional seismic energy wave received, and the substantially orthogonal vertical shear seismic energy receiver RSV2 to maximize the vertical shear seismic energy wave received. This action thereby substantially separates the compressional wave from the vertical shear wave. Theoretically, an angle of emergence may vary between the extremes of −90° and 90° for physically oriented receivers, although a smaller range is more practically encountered due to field and equipment constraints.

From a practical perspective, the orientation of the first and second receivers to a compression/vertical shear space is more easily achieved by applying an algorithm to the data received. For the embodiment of FIG. 6 where the axis of the compression seismic energy receiver RP2 is horizontal, an algorithm in the form of a trigonometric relationship may be applied. Referring to FIG. 6, the second angle of emergence $\Theta_{V2}$ may be defined by:

$$\tan \Theta_{V2} = D2/(SRDis/2), \text{ and}$$

$$\Theta_{V2} = \text{Arctan}\ [D2/(SRDis/2)].$$

For this case, the second angle of emergence $\Theta_{V2}$ may vary from about 0° when the source station A and the receiver station B are widely separated to about 90° when they are in close proximity. Clearly, other methods and algorithms exist for calculating an angle of emergence and are well within the broad scope of the present invention.

As may be seen, again, in FIG. 5, an angle of emergence is a depth-dependent quantity. Therefore, aligning the compression seismic receiver RP2 with the second angle of emergence $\Theta_{V2}$ tends to focus the reflected, time-variant seismic energy, both compressional and vertical shear waves, emanating from the second subterranean feature F2 in the embodiment of FIG. 6. This particular alignment also tends to defocus the reflected, time-variant seismic energy emanating from other subsurface areas such as the first subterranean feature F1 of FIG. 5. Specifically, this capability provides a powerful tool for both separating the compressional and vertical shear waves and focusing an investigation on selected subterranean targets. Generally, this capability also provides a system and method for analyzing and interpreting an investigation of all subsurface characteristics by sweeping through all angles of emergence associated with a set of seismic data.

Figure 7:
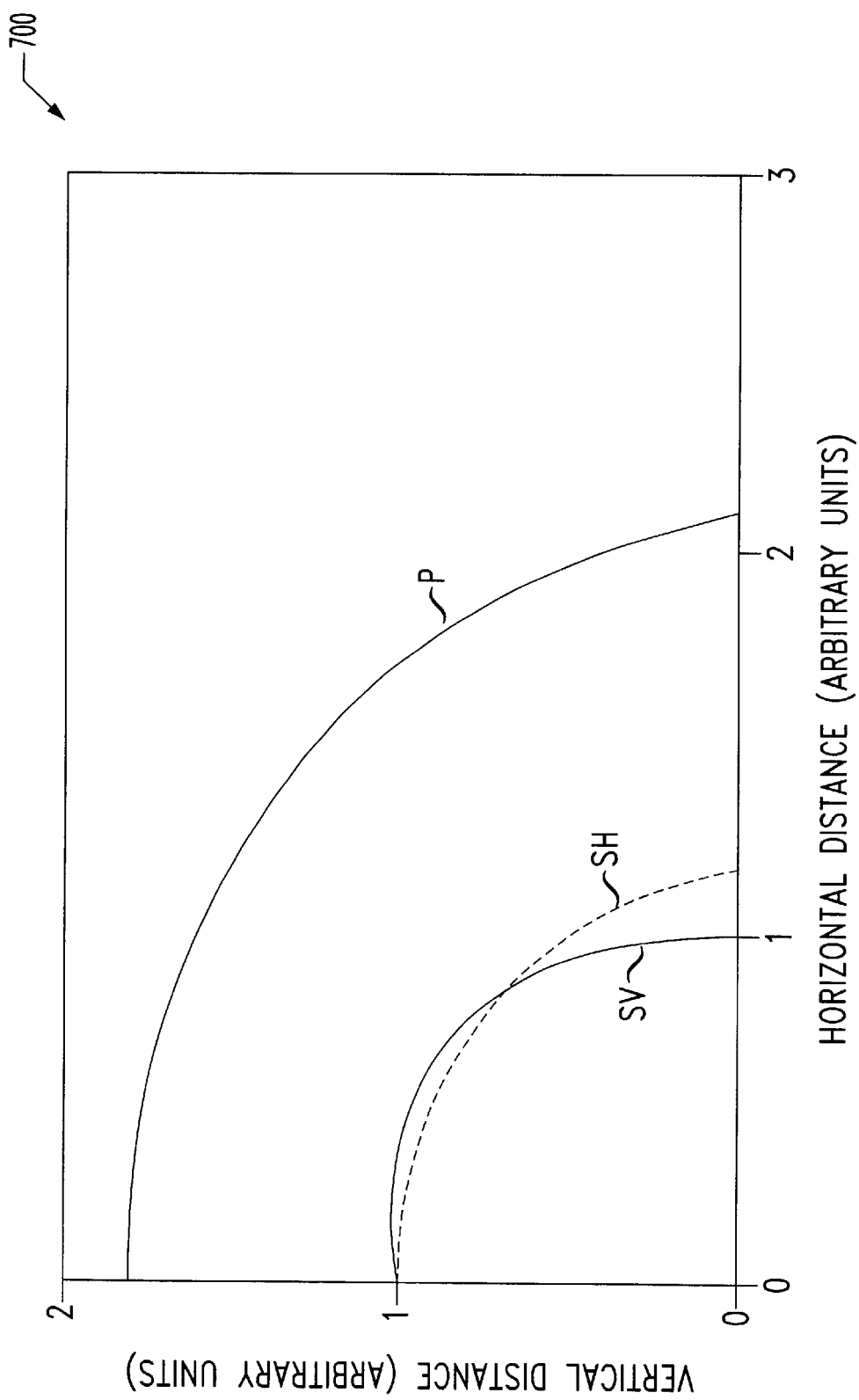
FIG. 7 illustrates a graph of wave-velocity surfaces in a transversely isotropic Earth having a vertical axis of symmetry.

Turning now to FIG. 7, illustrated is a graph of wave-velocity surfaces 700 in a transversely isotropic Earth having a vertical axis of symmetry. The wave-velocity surfaces 700 include a compressional wave-velocity surface P, a horizontal shear wave-velocity surface SH and a vertical shear wave-velocity surface SV. At vertical or normal incidence of propagating shear waves, there is no distinction between vertical and horizontal shear waves since both waves have partical motion or polarization in the horizontal plane. Distinction in amplitude and usually in traveltime as well between vertical and horizontal shear waves become apparent for non-vertical angles of incidence.

In FIG. 7, the abscissa and ordinate axes represent horizontal and vertical propagation, respectively. In an isotropic medium, the wave surface curves would be semicircles thereby demonstrating the same apparent wave velocity at all angles of incidence. For the case of vertical transverse isotropy (i.e., layering of different stratums), horizontal and vertical shear velocities SH, Sv are the same at vertical incidence. However, the horizontal shear velocity SH is greater than the vertical shear wave velocity Sv for horizontally traveling waves, since the horizontal shear wave-velocity surface SH is seen to intersect the abscissa at a greater distance from the origin than does the vertical shear wave-velocity surface SV. Additionally, it may be noted that the horizontal and vertical shear wave-velocity surfaces SH, SV cross. FIG. 7 reveals that for small angles of incidence (near the ordinate), the vertical shear velocity Sv is greater than the horizontal shear velocity SH. At larger angles of incidence (near the abscissa) the horizontal shear velocity SH is greater that the vertical shear velocity Sv.

It may also be concluded from FIG. 7 that the splitting of traveltime between vertical and horizontal shear energies is not associated with a transverse anisotropy, such as vertical cracks or fractures. Therefore, any velocity-splitting analysis that may be applied to two-dimensional (2-D) prestack seismic data usually leads to a confusion of interpretation due to the noted differences between vertical and horizontal shear waves produced by vertical transverse isotropy. In 3-D shear wave seismic data acquisition situations, the concept of anisotropic velocity splitting is further confused by mixing of the various and variable source-receiver azimuths that are typically involved in these conventional 3-D data acquisition and recording templates.

Figure 8:
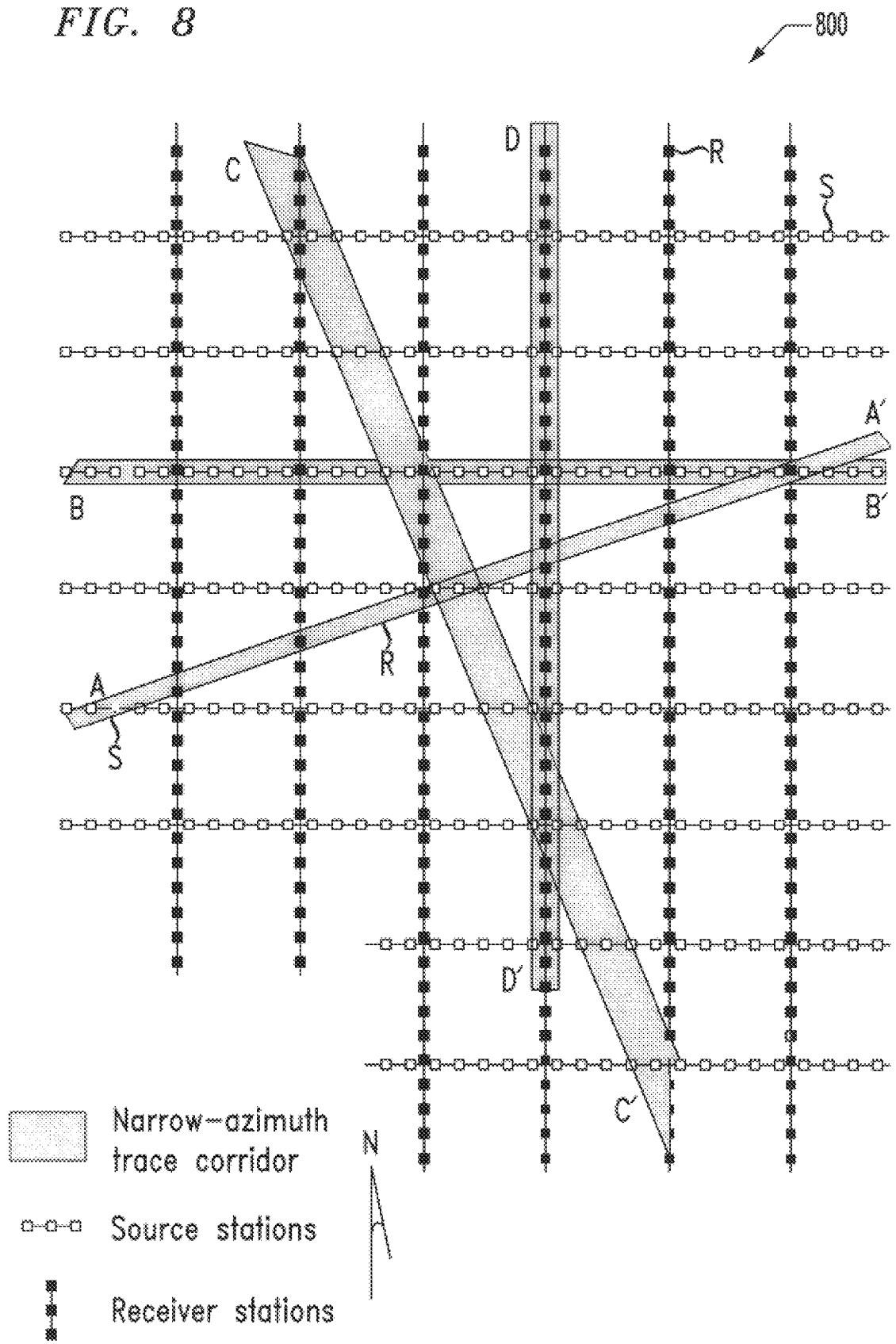
FIG. 8 illustrates a plan view of an embodiment of a seismic survey system showing seismic energy wave corridors created in arbitrary azimuth directions across an ideal volumetric or 3-D multicomponent data acquisition grid.

Turning now to FIG. 8, illustrated is a plan view of an embodiment of a seismic survey system 800 showing seismic energy wave corridors created in arbitrary azimuth directions across an ideal volumetric or 3-D multicomponent data acquisition grid, constructed according to the principles of the present invention. The seismic survey system 800 includes a collection of inline receiver stations R and a collection of crossline source stations S as shown. Each receiver station R employs three essentially orthogonal seismic energy receivers, and each source station S employs three essentially orthogonal seismic energy sources, as discussed in FIG. 1A. The seismic survey system 800 also includes first, second, third and fourth seismic energy wave corridors AA', BB', CC', DD' collectively designated as seismic energy wave corridors AA'–DD'. The seismic energy wave corridors AA'–DD' represent only a few of the options with which the source and receiver stations S, R may be segregated into differing corridor widths having a narrow-azimuth that is constructed according to the principles of the present invention.

The present invention, therefore, provides a system for and a method of determining anisotropy in a stratum using scattered horizontal shear energy and vertical shear energy modes reflected from a subsurface interface. In the illustrated embodiment, each of the seismic energy wave corridors AA'–DD' focuses an investigation into a relatively narrow direction, which corresponds to a particular azimuth, thereby allowing the direction of an anisotropy to be more closely determined. Recall that the azimuth angle $\Theta_H$ is defined as the angle between the crossline direction and a straight line formed through a source-receiver station pair, as is shown in FIG. 3.

In the illustrated embodiment, the seismic energy wave corridors AA'–DD' may be defined only after appropriate source-receiver data have been transformed into a radial and transverse orientation (radial/transverse coordinate space). This transformation orients first and second seismic energy receivers such that the first seismic energy receiver is aligned radially with a seismic energy source, and the second seismic energy receiver is aligned substantially transverse with the seismic energy source. Each of the seismic energy wave corridors AA'–DD' extends along a radial path between the seismic energy source and the first seismic energy receiver chosen in each of the seismic energy wave corridors AA'–DD'. Then, the seismic data received by the first and second seismic receivers within a corridor includes vertical and horizontal shear components, respectively. This action separates vertical and horizontal shear component data.

Additionally, this embodiment also employs a compression and vertical shear coordinate orientation (compression/vertical shear space) as a function of an angle of emergence $\Theta_V$, which further separates the compressional and vertical shear energies as discussed in FIG. 6. This orientation aligns the first seismic energy receiver substantially perpendicular to the reflected seismic energy wave, which defines the angle of emergence $\Theta_V$, to thereby maximize the vertical shear energy received by the first seismic energy receiver. The first seismic energy receiver is also oriented in a vertical plane containing the seismic energy source and the second seismic energy receiver is oriented in a plane substantially perpendicular to this vertical plane. A third seismic energy receiver is employed to receive compressional energy of the reflected seismic energy wave.

In the illustrated embodiment, an algorithm is employed that manipulates the initial data to mathematically orient the first, second and third seismic energy receivers with the reflected seismic energy wave, as described above. The computer 110 employed in the recording vehicle 105 of FIG. 1A or another computer system may be configured to use the algorithm to manipulate the initial data to orient the first, second and third seismic energy receivers. Of course, physically orienting the first, second and third seismic energy receivers to receive the reflected seismic energy wave in the manner stated above is also well within the broad scope of the present invention. Additionally, a plurality of receiver stations having a plurality of seismic energy receivers are typically employed within a seismic energy wave corridor.

Within any seismic energy wave corridor (e.g., the first seismic energy wave corridor AA') a corridor azimuth $\Theta_{HC}$ connecting an arbitrary source station S and an arbitrary receiver station R may be described by:

$$\Theta_{HC} = \Theta_H \pm \Delta\Theta_H.$$

The azimuth angle $\Theta_H$ was defined earlier, and $\Delta\Theta_H$ is the corridor deviation around the azimuth angle $\Theta_H$ allowed for the selected seismic energy wave corridor. Therefore, the corridor deviation $\Delta\Theta_H$ defines a corridor width W of the selected seismic energy wave corridor, which is constant for the corridor embodiments shown in FIG. 8. The corridor width W defines the plurality of receiver stations for a chosen source station that may be allowed to contribute to the trace gathers for the selected seismic energy wave corridor.

As described in the illustrated embodiment, the application of seismic energy wave corridors allows an appropriate separation of vertical and horizontal seismic energy waves, both from one another and from compressional energy waves. This separation allows an enhanced determination of first-order variations in the velocities of vertical and horizontal shear waves due to anisotropy in strata. Application of the seismic energy wave corridor also allows the extent of and changes in characteristic for a particular anisotropy as a function of azimuthal direction to be more clearly ascertained.

Figure 9:
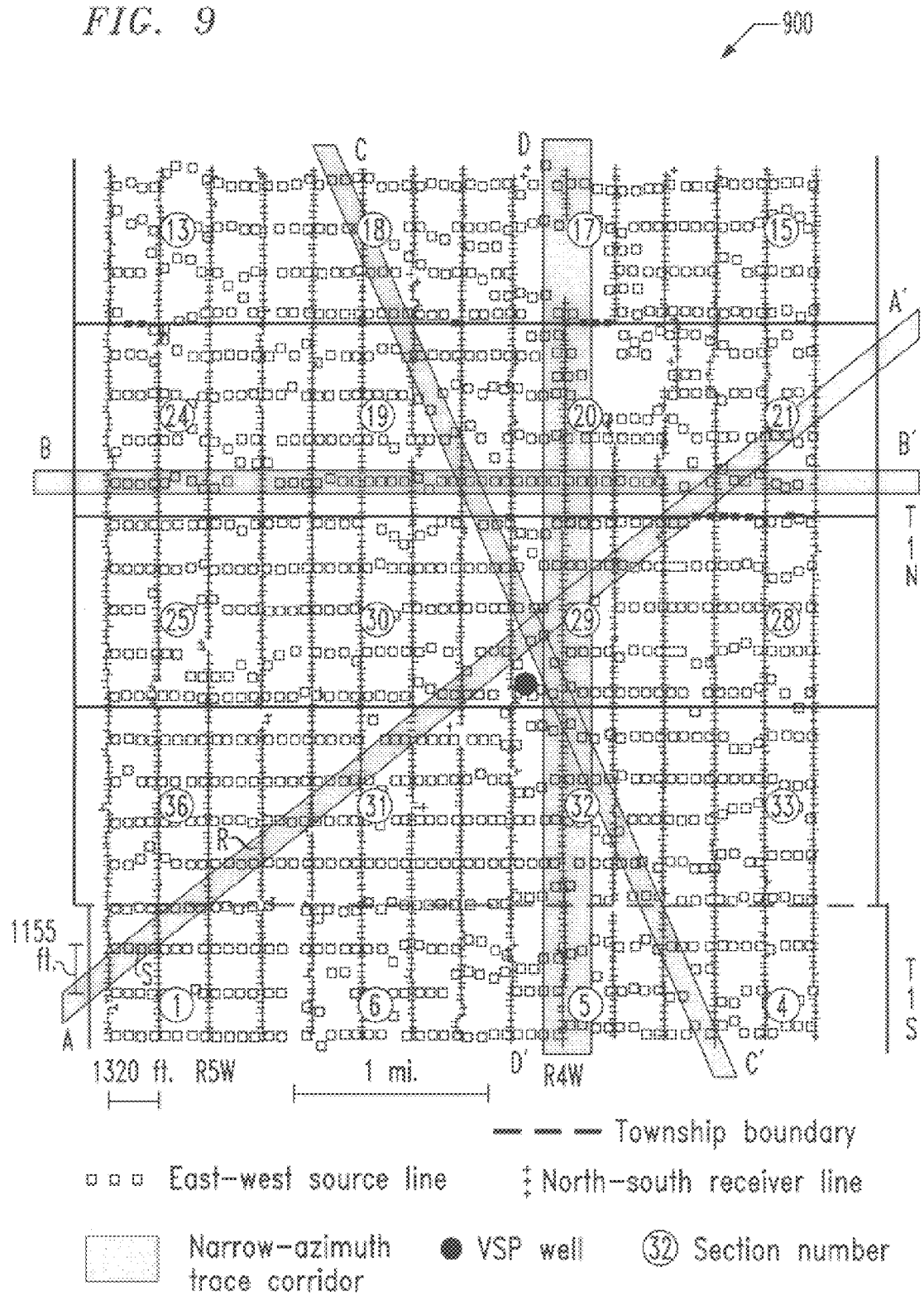
FIG. 9 illustrates a plan view of an embodiment of a seismic survey system showing seismic energy wave corridors created in arbitrary azimuth directions across an actual 3-D multicomponent data acquisition grid.

Turning now to FIG. 9, illustrated is a plan view of an embodiment of a seismic survey system 900 showing seismic energy wave corridors created in arbitrary azimuth directions across an actual 3-D multicomponent data acquisition grid. As in FIG. 8, the seismic survey system 900 includes a collection of inline receiver stations R and a collection of crossline source stations S as shown. Each receiver station typically employs three essentially orthogonal seismic energy receivers, and each source station typically employs three essentially orthogonal seismic energy sources, as discussed in FIG. 1A. The seismic survey system 900 also includes first, second, third and fourth seismic energy wave corridors AA', BB', CC', DD' collectively designated as seismic energy wave corridors AA'–DD'. The seismic energy wave corridors AA'–DD' again represent only a few of the options with which the source and receiver stations S, R may be segregated into differing corridor widths having a narrow-azimuth that is constructed according to the principles of the present invention.

The seismic survey system 900 differs from the ideal 3-D multicomponent data acquisition grid of the seismic survey system 800 of FIG. 8 in that some source stations are omitted due to permitting restrictions and other source stations are offset due to surface constraints. The seismic survey system 900 illustrates that even in such real-world situations there are still a sufficient number of source and receiver stations within arbitrary narrow-azimuth seismic energy wave corridors to allow a sufficiently high-fold trace gather to be constructed. This will allow the creation of a sufficient signal-to-noise ratio needed for accurate shear wave analysis and the enhanced detection of anisotropic strata.

Figure 10:
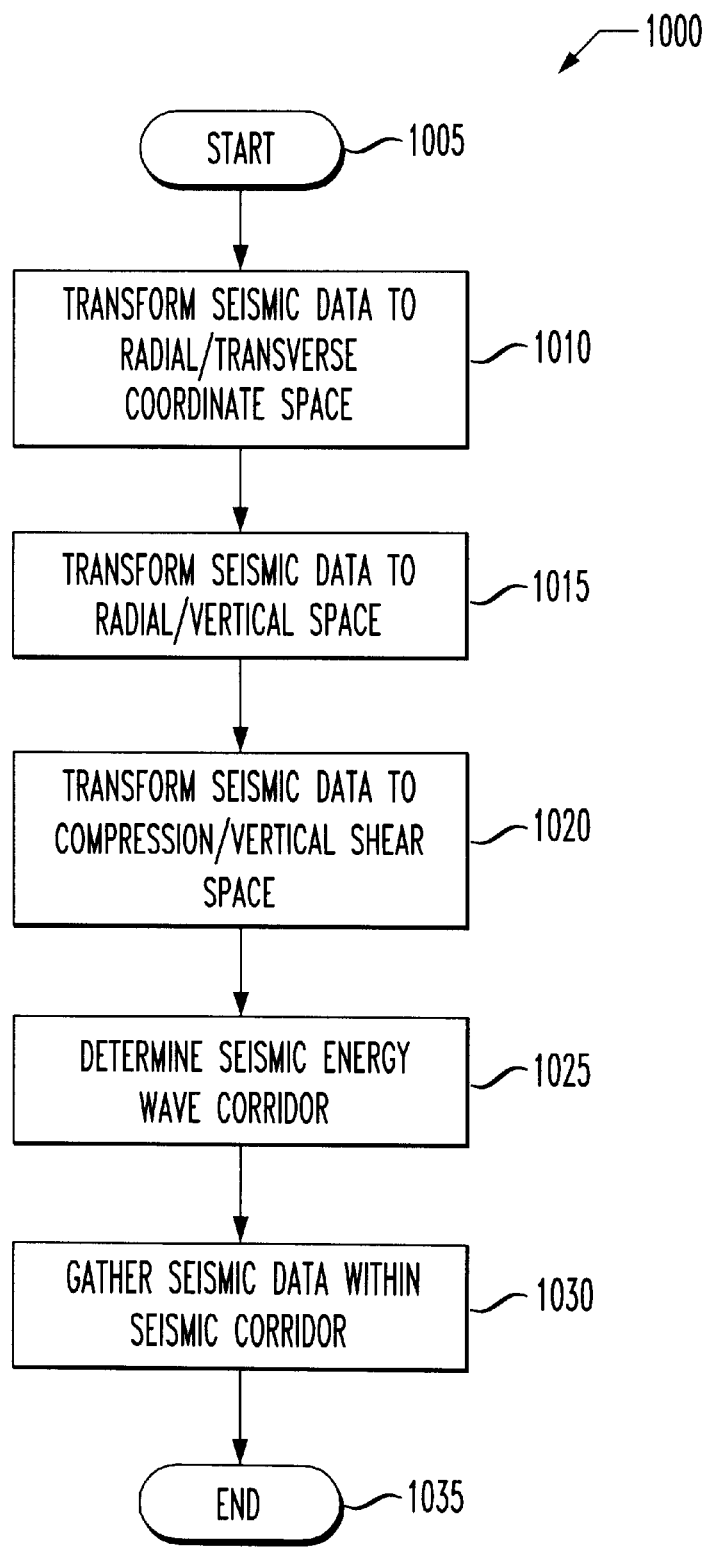
FIG. 10 illustrates a flow diagram of an embodiment of a method representing the steps employed in an algorithm and computer software that can be used to obtain the desired seismic data.

Turning now to FIG. 10, illustrated is a flow diagram of an embodiment of a method 1000 representing the steps employed in the aforementioned algorithm and computer software that can be used to obtain the desired seismic data. The method 1000 starts with an intention to determine anisotropy in a stratum, in a step 1005. Then, in a step 1010, the method 1000 employs a unique coordinate rotation to transform horizontal sources and receivers from an inline and crossline orientation (field coordinate space) to a radial and transverse orientation (radial/transverse coordinate space) wherein a trigonometric rotation of both sources and receivers by an azimuth angle $\Theta_H$ is accomplished through manipulation and processing of recorded seismic data.

This coordinate rotation transforms the seismic data to allow a first seismic receiver Rr and a first seismic energy source Sr, which are oriented in the radial direction, to effectively provide a wavefield that is dominated by compression and vertical shear modes. Correspondingly, this rotation also transforms the seismic data to allow a second seismic receiver Rt and a second seismic energy source St, which are oriented in the transverse direction, to effectively provide a wavefield that is dominated by horizontal shear reflections having minimal interfering compression and vertical shear modes.

The radial/transverse coordinate space, accomplished in the step 1010, is further transformed to a radial and vertical coordinate orientation (a radial/vertical space) employing a vertically sectioned plane taken along the straight line formed through a source-receiver pair, in a step 1015. This situation provides another intermingled data condition that again typically complicates processing processing, imaging and interpreting seismic information.

Then, in a step 1020, the radial/vertical space is transformed to a compression and vertical shear coordinate orientation (a compression/vertical shear space) employing a rotation, by an angle of emergence $\Theta_V$, of both the radially oriented receiver and the vertically oriented receiver employed in the step 1015. This action thereby substantially separates the compressional wave from the vertical shear wave. The angle of emergence $\Theta_V$ may be defined, where D is the depth of a subterranean feature, and SRDis is the distance from a seismic source S to a seismic receiver R, as:

$$\Theta_V = \text{Arctan}\,[D/(SRDis/2)].$$

Next, a seismic energy wave corridor is determined in a step 1025. Within any seismic energy wave corridor, a corridor azimuth EHC connecting an arbitrary source station S and an arbitrary receiver station R may be described by:

$$\Theta_{HC} = \Theta_H + \Delta\Theta_H,$$

where $\Theta_H$ is the azimuth angle, and $\Delta\Theta_H$ is a corridor deviation around the azimuth angle $\Theta_H$ that is allowed for the selected seismic energy wave corridor. The corridor deviation $\Delta\Theta_H$ defines a corridor width W of the selected seismic energy wave corridor, which is constant for the corridor. Then, in a step 1030, the corridor width W defines the plurality of receiver stations for a chosen source station that may be allowed to contribute to the trace gathers for the selected seismic energy wave corridor. The application of seismic wave corridors allows an appropriate separation of vertical and horizontal seismic energy waves. This separation allows an enhanced determination of first-order variations in the velocities of vertical and horizontal shear waves due to anisotropy in strata. The method 1000 ends in a step 1035.

Although the present invention has been described in detail, those skilled in the art should understand that they can make various changes, substitutions and alterations herein without departing from the spirit and scope of the invention in its broadest form.

What is claimed is:

1. A method of determining anisotropy in a stratum using scattered horizontal shear and vertical shear modes, comprising:

transforming a seismic energy wave generated by a seismic energy source and received by seismic receivers into radial/transverse coordinate space;

determining a seismic energy wave corridor along a radial path between said seismic energy source and said seismic receivers;

gathering seismic data received by said seismic receivers within said corridor, said data including horizontal and vertical shear components.

2. The method as recited in claim 1 wherein transforming includes:

orienting a first seismic receiver with a seismic energy source along a radial path between the first seismic receiver and the seismic energy source to obtain a vertical shear component; and aligning a second seismic receiver substantially transverse to said radial path to obtain a horizontal shear component.

3. The method as recited in claim 2 wherein said first and second seismic energy receivers are substantially orthogonal with respect to each other and transforming further includes:

orienting first and second seismic energy receivers such that said first seismic energy receiver is aligned substantially perpendicular to a reflected seismic energy wave having an angle of emergence to thereby maximize said vertical shear energy received by said first seismic energy receiver and said second seismic energy receiver is aligned substantially tangential to said energy wave.

4. The method as recited in claim 3 wherein said seismic energy receiver further includes a third seismic energy receiver substantially orthogonal to said first and second seismic energy receivers and orienting first and second seismic energy receivers includes aligning said third seismic energy with said reflected seismic energy wave.

5. The method as recited in claim 1 wherein transforming seismic energy includes transforming waves generated by a seismic energy source and received by a plurality of seismic receivers within said corridor into radial/transverse coordinate space.

6. The method as recited in claim 5 wherein gathering includes summing data received by said plurality of seismic receivers and dividing said plurality of seismic receivers into stacking bins.

7. The method as recited in claim 1 wherein determining includes determining an azimuth of said corridor with respect to the seismic energy source and a width of said corridor.

8. A system for determining anisotropy in a stratum using scattered horizontal shear and vertical shear modes, comprising:

a seismic energy source;

reflected seismic energy wave reflected from a subsurface interface and having horizontal shear energy and vertical shear energy associated therewith; and first and second seismic energy receivers, wherein said first seismic energy receiver is aligned radially with said seismic energy source and wherein said second seismic energy receiver is aligned substantially transverse with said seismic energy source;

a seismic energy wave corridor extending along a radial path between said seismic energy source and said first seismic energy receiver;

seismic data received by said first and second seismic receivers within said corridor, said data including vertical and horizontal shear components; and separated vertical and horizontal shear component data.

9. The system as recited in claim 8 wherein said first seismic energy receiver is aligned substantially perpendicular to said reflected seismic energy wave having an angle of emergence to thereby maximize said vertical shear energy received by said first seismic energy receiver.

10. The system as recited in claim 9 wherein said first seismic energy receiver is oriented in a vertical plane containing said seismic energy source and said second seismic energy receiver is oriented in a plane substantially perpendicular to said vertical plane.

11. The system as recited in claim 9 wherein said angle of emergence is between 0° and 90°.

12. The system as recited in claim 9 wherein said first seismic energy receiver is physically oriented to receive data.

13. The system as recited in claim 9 further including:

a third seismic receiver for receiving compressional energy of said reflected seismic energy wave;

initial data representing reflected compressional and vertical shear energy; and an algorithm that manipulates said initial data to mathematically orient said first receiver and mathematically orient said third receiver with said reflected seismic energy wave.

14. The system as recited in claim 13 further including a computer configured to use said algorithm to manipulate said initial data to orient said first and third seismic energy receivers.

15. The system as recited in claim 14 further including radial coordinates, compressional coordinates, vertical coordinates and vertical shear coordinates.

16. The system as recited in claim 8 wherein said second seismic energy receiver is aligned substantially perpendicular to a plane containing said reflected seismic energy wave.

17. The system as recited in claim 8 further including a plurality of seismic receivers within said corridor.

18. The system as recited in claim 8 wherein said first and second energy receivers are orthogonal with respect to each other.

19. A method of exploring a subterranean feature with seismic energy, comprising generating a seismic energy wave toward a subterranean feature;

reflecting said seismic energy from said subterranean feature to produce a reflected seismic energy wave having vertical and horizontal shear energy associated therewith;

transforming seismic energy wave generated by a seismic energy source and received by seismic receivers into radial/transverse coordinate space;

determining a seismic energy wave corridor along a radial path between said seismic energy source and said seismic receivers;

gathering seismic data received by said seismic receivers within said corridor, said data including horizontal and vertical shear components.

20. The method as recited in claim 1 wherein transforming includes:

orienting a first seismic receiver with a seismic energy source along a radial path between the first seismic receiver and the seismic energy source to obtain a vertical shear component; and aligning a second seismic receiver substantially transverse to said radial path to obtain a horizontal shear component.

21. The method as recited in claim 20 wherein said first and second seismic energy receivers are substantially orthogonal with respect to each other and transforming further includes:

orienting first and second seismic energy receivers such that said first seismic energy receiver is aligned substantially perpendicular to a reflected seismic energy wave having an angle of emergence to thereby maximize said vertical shear energy received by said first seismic energy receiver and said second seismic energy receiver is aligned substantially tangential to said energy wave.

22. The method as recited in claim 21 wherein said seismic energy receiver further includes a third seismic energy receiver substantially orthogonal to said first and second seismic energy receivers and orienting first and second seismic energy receivers includes aligning said third seismic energy with said reflected seismic energy wave.

23. The method as recited in claim 19 wherein transforming seismic energy includes transforming waves generated by a seismic energy source and received by a plurality of seismic receivers within said corridor into radial/transverse coordinate space.

24. The method as recited in claim 23 wherein gathering includes summing data received by said plurality of seismic receivers and dividing said plurality of seismic receivers into stacking bins.

25. The method as recited in claim 19 wherein determining includes determining an azimuth of said corridor with respect to the seismic energy source and a width of said corridor.

* * * * *